Nov. 11, 1947. J. P. BURKE 2,430,555
NUT
Filed Oct. 27, 1944

INVENTOR.
James P. Burke
BY
Albert J. Taylor
Att'y

Patented Nov. 11, 1947

2,430,555

UNITED STATES PATENT OFFICE 2,430,555

NUT

James P. Burke, Poland, Ohio, assignor to F. L. McLaughlin, Detroit, Mich.

Application October 27, 1944, Serial No. 560,622

2 Claims. (Cl. 85—36)

This invention relates to fastening means and particularly concerns a nut having a resiliently flexible body portion adapted to be snapped into an aperture in a sheet metal member or the like and which is adapted to engage the walls of the aperture in such manner as to retain the nut in place until a securing element such as a screw or bolt may be inserted therein.

The primary object of the invention is to provide a nut of the type above mentioned which is of sheet metal construction and which is formed with screw thread engaging prongs which function to expand or bulge the flexible body portion and thereby more securely retain the nut in an aperture as a screw is tightened in engagement therewith. To attain this object the nut is formed with a body portion which is resiliently compressible so that it may collapse slightly when it engages the side walls of an aperture, to enable its insertion thereinto. The body portion is formed with portions adapted to more or less hook under the side walls of the aperture so that as the body portion expands to or about to its original size after insertion in the aperture the nut is yieldingly held in the aperture. In case removal of the nut is desired all that is necessary is to manually compress the body portion so as to free said retaining portions from their interlocking relationship with the walls of the aperture. Screw engaging prongs are formed integral with the body portion and are so related thereto angularly that when a screw is drawn tight thereagainst the prongs tend to expand the body portion so that it becomes impossible for the interlocking portions to become disengaged from the walls of the aperture. By this action the tighter the screw is drawn the more securely the nut is retained in the aperture.

The nut above referred to has particular utility in cases where it is desired to secure one element to another element having a blind hole, or in other words to another element where it is impossible to gain access to the rear side, either to place the nut or to hold it from turning when a screw is inserted therein. With the present nut, it may be snapped into an aperture from the front face, and the aperture may be round or other than round in shape. The other than round aperture, such for example as a rectangular or D shaped opening is preferred because in that case the nut engages the sides of the aperture and is thus prevented from turning.

Figure 1:
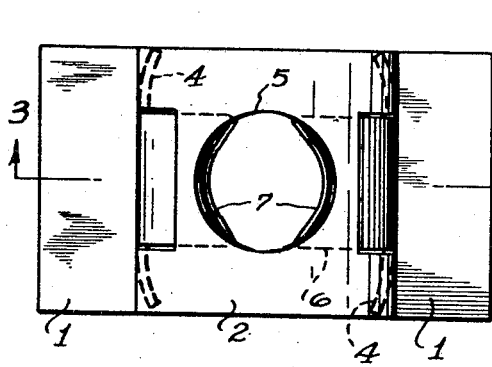
Figure 4:
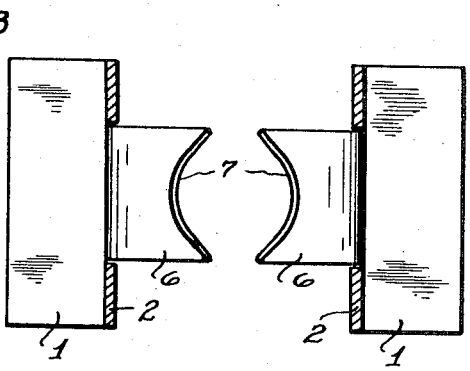
Figure 2:
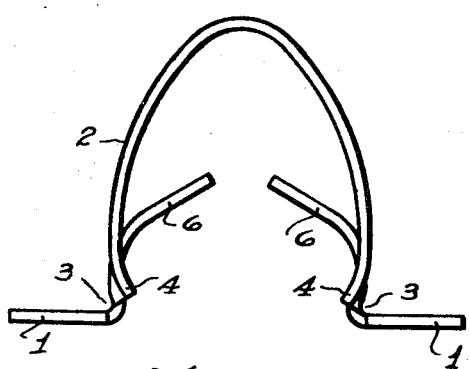
Figure 3:
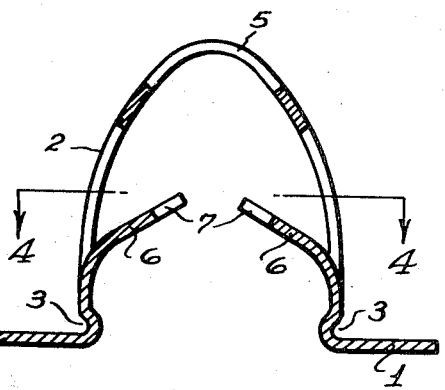
Figure 5:
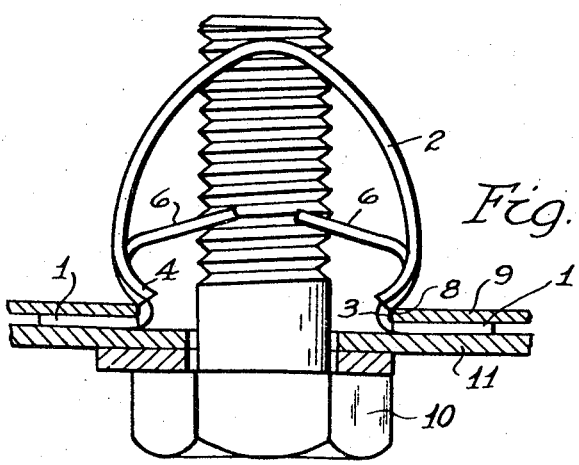

With the above and other objects in view the invention is more fully disclosed with reference to the accompanying drawing in which Fig. 1 is a top plan view, Fig. 2 is a side elevation, Fig. 3 is a section taken on the line 3—3 of Fig. 1, Fig. 4 is a section taken on the line 4—4 of Fig. 3, and Fig. 5 is an elevation illustrating a screw in operative engagement with the nut.

More specifically, the numeral 1 designates two sheet metal wings or end portions which are united by a central portion 2 which is dome shaped as viewed in Fig. 2 so that by pressing on opposite sides thereof, manually, the wings or end portions as well as the opposite sides of the domed portion may be sprung toward each other. At the juncture of the central portion 2 with each of the wings or end portions 1 there is formed a recession 3. In addition, at opposite sides of the nut, the central portion is partially severed from the wings or end portions, and these partially severed portions, designated 4, are bent inwardly as may readily be seen by comparison of Figs. 1 and 2.

In the uppermost part of the central portion is formed an aperture 5. This aperture provides clearance for a screw and, as hereinafter more particularly described, the walls of the aperture constitute guide means to prevent the screw from cocking as it is placed in contact with the nut.

Struck inwardly, in opposed relation from opposite sides of the central portion, are screw thread engaging prongs 6. As may be seen more clearly in Fig. 4, the ends or terminals of the prongs are notched at 7 to provide for an encircling engagement with the threads of a screw.

The manner in which the present nut is used is illustrated in Fig. 5. The nut is inserted into the aperture 8 in a sheet metal member 9, its insertion being made possible by compressing the opposite sides of the central portion 2. When the nut is so inserted and released the central portion 2 expands to or nearly to its original size, causing the recessions 2 to engage the walls of the aperture 8, to thereby retain the nut in the aperture. In the case of an aperture of say square shape the sides of the nut will engage the sides of the aperture and will prevent the nut from rotating when a screw is inserted therein. The screw is shown at 10. It is inserted through the member 11 which serves to illustrate an element to be secured to the member 9. The threads of the screw are placed in engagement with the prongs 6 and as the screw is tightened it tends to draw the prongs downwardly or toward the plane of the wings or end portions 1. As the prongs are thus drawn downwardly they exert an outward thrust with respect to the central portion 2, and actually cause outward distortion of the central portion. This outward distortion causes the central portion to bulge over the sides of the aperture 8 so that removal of the nut is impossible unless the screw is removed.

In case the aperture in which the nut is inserted is of round shape the wall of the aperture engages under the partially severed portions 4, and the nut is thus retained in the aperture.

The above described nut is of the quick acting type in that it is not necessary to rotate a screw in order to place it in operative engagement with the thread engaging prongs. That is to say, the screw may be pushed axially between the prongs, which will expand and snap over the threads until the screw is fully inserted. Then the screw is rotated to tighten it. With this type of nut there is a tendency for the screw to cock between the prongs, in which case it has to be rotated with difficulty to withdraw it. In the case of the nut here disclosed the tendency for the screw to cock is eliminated because of the presence of the aperture 5. The walls of the aperture 5 constitute guide surfaces for engagement by the screw to prevent it from cocking.

Although a specific embodiment of the invention has been illustrated and described it will be understood that various changes may be made within the scope of the appended claims without departing from the spirit of the invention, and such changes are contemplated.

What I claim is:

1. A sheet metal nut comprising opposed wings integrally united by a central portion, said central portion being bowed and of dome shape to provide flexibility enabling its insertion in an aperture by compressing opposite sides thereof toward each other, said central portion being partially severed at the juncture thereof with said wings and having said partially severed portions bent inwardly to provide undercuts adapted to engage the walls of an aperture in such manner as to retain the nut in the aperture, screw thread engaging prongs formed integral with said central portion and extending inwardly and angularly from opposite sides of said central portion, said screw thread engaging prongs being formed by striking portions of said central portion inwardly in such manner that the prongs are disposed within the dome shape and with their juncture with the central portion immediately adjacent the juncture of the central portion with respective wing portions, said thread engaging prongs being adapted through engagement of a screw therewith to set up forces tending to expand said central portion.

2. A sheet metal nut comprising opposed wings integrally united by a central portion, said central portion being bowed and of dome shape to provide flexibility enabling its insertion in an aperture by compressing opposite sides thereof toward each other, said central portion being partially severed at the juncture thereof with said wings and having said partially severed portions bent inwardly to provide undercuts adapted to engage the walls of an aperture in such manner as to retain the nut in the aperture, screw thread engaging prongs formed integral with said central portion and extending inwardly and angularly from opposite sides of said central portion, said screw thread engaging prongs being formed by striking portions of said central portion inwardly in such manner that the prongs are disposed within the dome shape and with their juncture with the central portion immediately adjacent the juncture of the central portion with respective wing portions, said thread engaging prongs being adapted through engagement of a screw therewith to set up forces tending to expand said central portion, said central portion having an aperture disposed in alignment with said prongs the walls of which constitute guide surfaces to prevent cocking of a screw as it is placed in engagement with said prongs.

JAMES P. BURKE.

REFERENCES CITED

The following references are of record in the file of this patent:

UNITED STATES PATENTS

| Number | Name | Date |
| --- | --- | --- |
| 2,369,962 | Gisondi | Feb. 20, 1945 |
| Re. 22,543 | Tinnerman | Sept. 5, 1944 |
| 1,241,181 | Wilhelm | Sept. 25, 1917 |
| 1,570,148 | Herr | Jan. 19, 1926 |
| 2,368,027 | Johnson | Jan. 23, 1945 |